Jan. 1, 1952   J. L. ELLIS ET AL   2,581,253
METALLURGY
Filed Dec. 23, 1948
2 SHEETS—SHEET 1

INVENTORS
JOHN L. ELLIS
CLAUS G. GOETZEL
BY
Hammond & Littell
ATTORNEYS

Jan. 1, 1952

J. L. ELLIS ET AL 2,581,253

METALLURGY

Filed Dec. 23, 1948

INVENTORS
JOHN L. ELLIS
BY CLAUS G. GOETZEL

Hammond & Littell
ATTORNEYS

Patented Jan. 1, 1952

2,581,253

UNITED STATES PATENT OFFICE 2,581,253

METALLURGY

John L. Ellis, New York, and Claus G. Goetzel, Yonkers, N. Y., assignors to Sintercast Corporation of America, New York, N. Y., a corporation of New York Application December 23, 1948, Serial No. 66,928

10 Claims. (Cl. 266—1)

This invention relates to the forming of composite material shaped bodies of metals, alloys, metal compounds, refractories and the like, and, particularly, to the impregnation of a high melting point porous skeleton with a second lower melting metal.

In the manufacture of heat-resistant metallic articles, such as blades, buckets, valves, and the like, for jet engines, rockets, or gas turbines and the like, conventional casting or forging methods are not satisfactory. Powder metallurgy methods must be used so as to meet the high temperature requirements in the fields mentioned as well as in numerous other places.

Previously, composite material shaped bodies have been made by mixing the powders thereof and then shaping by pressing in a die, followed by heating or sintering until one of the constituents is melted so that the liquid metal fills the pores of the mixture. Also in prior practice, the first or higher melting constituent has been placed into a mold and a porous skeleton formed therein. Following this, the skeleton has been removed from the mold, sintered, and then placed in contact with, or immersed in a second or auxiliary lower melting metal, capillary action serving to fill the pores of the skeleton. In this latter case, the second metal has been brought into contact with the skeleton in a suitable ceramic or metallic boat, and then heat applied so as to liquefy the second metal and cause the same to be drawn into the skeleton by capillary action. Also the second metal has been placed in contact with the skeleton and melted, the impregnation taking place by capillary action. Among the difficulties in the process of infiltration by capillary action, there has been poor penetration, or no penetration at all, or, in some instances, where a pronounced solubility between skeleton and infiltrant material exists, skeleton erosion occurs.

One of the objects of the present invention is the production of uniform dense composite bodies from powdered materials, especially bodies having intricate shapes, so as to obtain improved physical characteristics at elevated temperatures.

Another object of the invention is to provide an improved mold arrangement for holding the porous skeletons during impregnation and for insuring complete impregnation of the skeleton.

In one aspect of the invention, a receptacle or crucible is arranged so that a removable core can be inserted therein, the core having an aperture or apertures for receiving and holding the skeletons to be impregnated. A conduit or passage connects the skeleton apertures or cavities with a means for feeding the lower melting metal to skeletons in apertures.

In the preferred form, the core has a reservoir therein with a conduit leading from the bottom thereof, to the bottoms of the apertures in which the skeletons to be impregnated are placed. The apertures may be shaped to conform to the particular object which is to be impregnated.

The receptacle may be arranged with gas inlet and outlet passages so as to apply pressure to the metal and so as to purge the skeleton of air or other undesirable gases. The core can be formed with removal inserts or liners serving as side walls of the skeleton receiving apertures, thus allowing repair of the core in the event of damage to the side walls thereof. The core may have suitable arrangements for supporting the skeletons to be impregnated above the bottoms of the conduits leading from the reservoir to the skeleton receiving apertures.

The skeleton can be made in various manners, such as described in applicant's copending application, Serial No. 793,990, filed December 26, 1947.

The reservoir preferably is arranged in relation to the skeletons in place in the skeleton receiving apertures so that the impregnating metal in the reservoir is above the top of the skeletons so that there will be a pressure head exerted thereon assisting in the impregnating action. The infiltrant or auxiliary second metal can be placed in the reservoir in the form of a porous mass or in the form of slugs so that the inert gas will pass to and through the porous skeletons. A heating means, such as a high frequency electrical current, can be used to heat the skeletons in the core and to melt the auxiliary metal in the reservoir. The casting can be carried out in a reducing atmosphere.

It is also possible to place a compressed skeleton into the mold and perform the sintering operation therein.

These and other objects, advantages, and features of this invention will become apparent from the following description and drawing which are merely exemplary.

Figure 1:
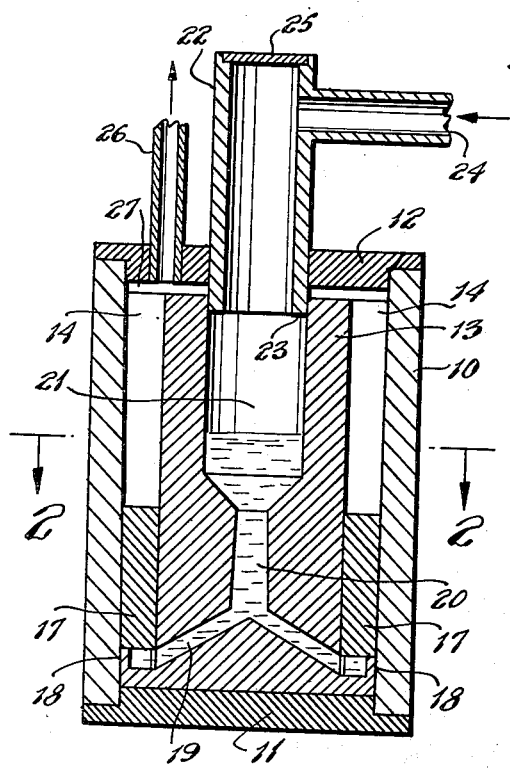
Figure 1 is a sectional elevation of one form of the invention.

The invention is particularly adapted for producing objects having various shapes, and the turbine blade illustrated is merely one example of a shape which can be impregnated in the apparatus of the present invention. The receptacle or crucible 10 can be of graphite and, if desired, may be coated on the inside with a cement, such as $Al_2O_3$, MgO, or BeO with a suitable binder. The bottom 11 and top 12 may be of graphite or other suitable material arranged so as to form a tight joint with the inside walls of the crucible or receptacle 10.

Core 13 is insertable as a unit into the receptacle when cover 12 is removed. The core or mold 13 preferably is made of graphite and should be coated on the working faces with $Al_2O_3$, MgO, or BeO, cement or a similar substance. Other materials than graphite may be used for the core, such as a non-conducting refractory oxide ceramic, for example, $Al_2O_3$, BeO, MgO, $ZrO_2$, and other durable ceramics. Other high melting materials such as SiC also can be used.

When a ceramic is used, an outside sleeve of graphite must be employed when utilizing electrical heating devices of the high frequency variety.

Any desired number of skeleton receiving cavities or apertures 14 may be provided around the periphery of the core 13, said apertures being arranged and shaped in accordance with the particular skeletons involved.

Figure 2:
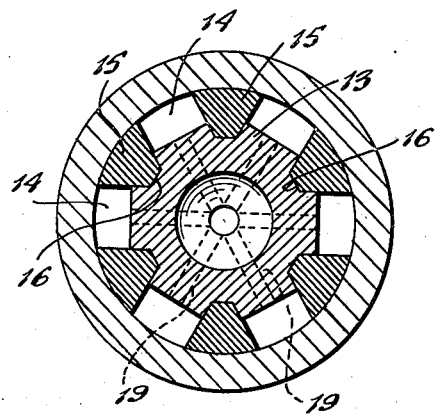
Figure 2 is a section taken along the line 2—2 of Figure 1.

In a preferred form of the invention, core 13 has inserts 15 (Fig. 2) placed in slots 16, said inserts being of the same material as the core and forming the side walls of the skeleton receiving cavities. By such an arrangement, when the walls of an insert become damaged, it is possible to replace the same and thus eliminate the necessity of replacing the entire core. In the alternative, the core and side walls may be formed of one piece.

The porous compressed powder compacts or skeletons 17 are shown in place in Figure 1 at the bottom of the skeleton receiving apertures or cavities 14. In the particular form illustrated, the skeletons to be impregnated are shown as rectangular blocks. A support or pedestal 18 is shown projecting upwardly into the skeleton receiving apertures from the bottom of the core so as to hold the skeleton in such a position that the impregnating metal may enter the bottom thereof from conduits 19, said conduits 19 radiating from a central conduit 20 which, in turn, is connected to the metal reservoir 21. It is noted that the metal reservoir is located above the tops of the skeletons 17 so as to provide a pressure head on the metal as it impregnates the porous skeletons 17.

A head or "riser" of metal also can be formed on the low pressure side of the skeleton where impurities can collect. By the use of a positive head of metal, the mold will be filled completely so as to maintain a definite size. In the arrangement described, undercasting of the skeletons can be performed wherein some portions of the mold do not have a skeleton and are filled by the infiltrant metal, thus producing a body with a dual structure.

Figure 5:
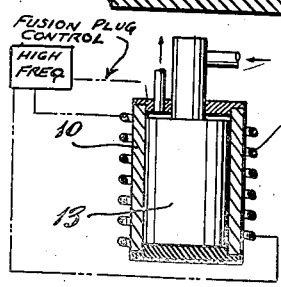
Figure 5 is a fragmentary elevation partially in section showing one form of heating arrangement.

If desired, one of the skeleton receiving apertures may be arranged so as to receive conventional temperature control alloy plugs, which once the heating cycle has reached their fusion temperature, liquefy, thereby causing closing of a special circuit between two refractory metal wires, such as platinum, which in turn operate a power shut-off relay, such an arrangement being shown in Figure 5.

The cover 12 of the receptacle can have various means for leading an inert or reducing gas to the metal reservoir 21. As an example, pipe 22 can be arranged so that its lower portion 23 snugly fits into the top of metal reservoir 21. The gas is connected to pipe 22 by means of inlet 24. A quartz window may be provided at 25 for temperature control purposes. A gas outlet 26 is provided at one side of the inlet 22 so as to receive gas passing through the skeletons into the annular space 27.

Figure 3:
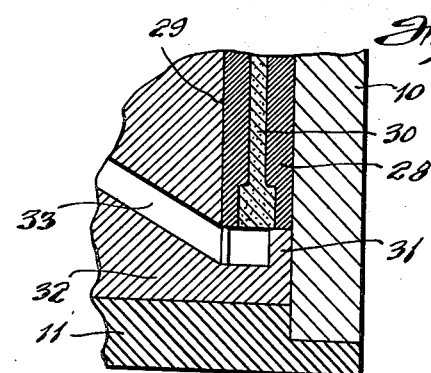
Figure 3 is an enlarged sectional view of one corner of the mold and receptacle showing the supports for the skeleton when a turbine blade is being formed.
Figure 4:
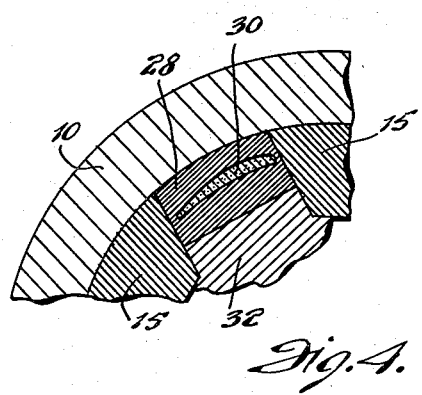
Figure 4 is a fragmentary sectional view showing a core with skeleton receiving aperture in the form of a turbine blade.

In the form illustrated in Figure 3, a suitable mold 28 is inserted in the skeleton receiving aperture 29, said mold being of separable elements or a suitable construction so that the turbine blade or other article 30 will be properly held therein and will be properly dimensioned relative thereto. The mold may be made of graphite, or a suitable ceramic such as $Al_2O_3$, MgO, BeO, etc. The skeleton 30 may be arranged so as to be positioned vertically by the pedestal or support 31 integral with the core 32 so as to provide access to the metal flowing from conduit 33 to the skeleton 30.

As may be seen in Figure 5, the receptacle 10 if made from graphite can have the high frequency conducting coil 35 surrounding the same for the purpose of heating the skeleton and auxiliary metal. The core 13 is shown schematically in Figure 5, the elements thereof being similar to those described for Figure 1.

Figure 6:
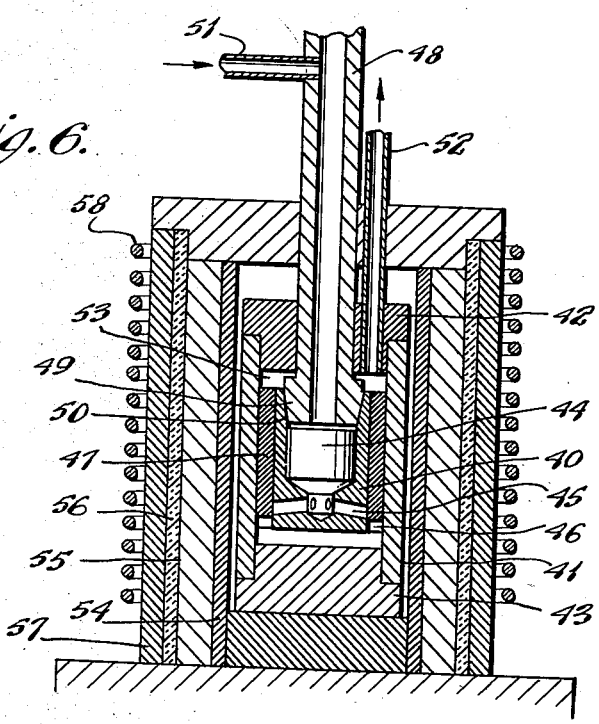
Figure 6 is a sectional elevation of one arrangement of the invention.

In Figure 6, core 40 can be insertible as a unit into receptacle 41, said receptacle having a top 42 and a bottom 43. The receptacle may have a reservoir 44 with conduits 45 leading therefrom into the skeleton receiving apertures 46, said apertures being similar to those described for the form shown in Figure 1. The skeletons 47 may be placed in said apertures and infiltrated by metal as desired. Conduit 48 may have a flared bottom portion 49 closely fitting the aperture 50 at the top of reservoir 44. A gas may be fed into conduit 48 through pipe 51. Exhaust pipe 52 may be employed to remove gas from cavity 53 and to provide a vacuum therein, if desired, on the exhaust or low pressure side of the skeletons.

The mold assembly can be placed within a graphite tube 54, said graphite tube being surrounded by carbon packing 55. Ceramic tube 56 is located outside of the carbon packing and can have an asbestos or heat insulating cover 57. The high frequency heating coil 58 may be of any suitable configuration and a source of high frequency energy connected to said coil.

Figure 7:
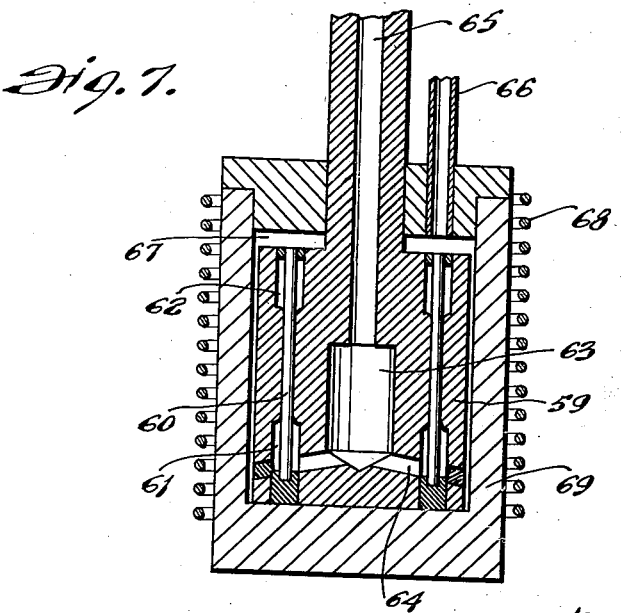
Figure 7 is a sectional elevation of another form of the invention.

In Figure 7 will be seen another form of the invention wherein the removable core 59 has interiorly located apertures for receiving skeletons 60 with widened portions 61 and 62 at the ends of said skeleton. Reservoir 63 supplies metal to said skeletons through conduits 64 in such a manner as to completely fill the cavities. This will provide an undercast section at either end of skeleton 60 or portion wherein the skeleton is not present. Conduit 65 can be used to furnish gas under pressure to the reservoir and exhaust pipe 66 provided to exhaust gas from aperture 67. High frequency heating coil 68 can be placed in proximity to the graphite receptacle 69 so as to heat the structure as described for the other forms of the invention. Various other types of cores may be used for undercasting purposes having suitable types of skeleton receiving apertures therein.

As an example, the skeleton is formed as desired exteriorly of the present apparatus and is then put into place in the skeleton receiving aperture or mold. As mentioned previously, the porous skeleton should be slightly hotter than the auxiliary or impregnating metal, such as, for example, 50 to 200° F. higher in temperature and this can be best accomplished by energizing high frequency type heating coils. The auxiliary metal is then placed in the metal reservoir 21 in suitable condition and the cover of the device closed. The auxiliary metal may be in the form of a porous body or in the form of conventional granular shot, cuttings, etc. The inert or reducing gas is then forced through pipe 24, past the auxiliary metal in the reservoir, through the porous skeleton and out of pipe 26.

A vacuum applied to pipe 26 tends to facilitate the gas flow process, and also aids in degassing the molten impregnating metal. Heat then can be applied to melt the auxiliary or impregnating metal, whereupon the gas under pressure will assist in forcing the molten metal into and completely impregnating the skeletons. It is to be understood that a suitable conduit means (not shown) can be used to feed the auxiliary metal into the reservoir without removing the cover.

Upon completion of the impregnation, the impregnated skeletons can be treated in various manners, such as disclosed in the aforementioned copending application.

In another aspect of the invention, the skeletons can be compressed and placed in the mold before sintering or before sintering is completed. Electric energy then can be applied and the sintering accomplished within the mold of the invention. The pressure vacuum arrangement will increase the speed of infiltration so as to reduce the time for solubility between skeleton and infiltrant and possibility of distortion or shape loss.

Another way in which the invention can be practiced is to feed hydrogen into pipe 66 (Fig. 7) as the auxiliary metal is being melted. This hydrogen purges the skeletons and is allowed to escape and burn out through opening 65. After the auxiliary metal is melted, a vacuum can be applied to pipe 66 so as to assist in the infiltration of the skeletons.

Instead of applying the vacuum immediately after melting, the infiltration can be permitted to take place by capillary action and then vacuum applied which will tend to solidify the infiltrated metal or to complete the infiltration.

It should be apparent that variations may be made in the described process and apparatus without departing from the spirit of the invention except as defined in the appended claims.

What is claimed is:

1. An apparatus for the metal infiltration of skeleton bodies produced by sintering from refractory metal and metal compound powders comprising an outer receptacle, a core in said receptacle, a plurality of chambers between the outside of said core and said receptacle to accommodate said skeleton bodies during their infiltration, a reservoir in said core to hold the infiltrating metal and conduits in the lower portion of said core and beneath said reservoir connecting the same with said outside chambers to lead the infiltrant metal to said skeleton bodies.

2. In an apparatus according to claim 1, molds in the chambers to accommodate the skeleton bodies.

3. In an apparatus according to claim 1, the metal holding reservoir being located at a higher level than the top of the skeleton bodies to form a pressure head.

4. In an apparatus according to claim 1, a removable cover for the receptacle and a center core removably located in said receptacle.

5. In an apparatus according to claim 1, the molten metal holding reservoir being located in the upper portion of the core to form a pressure head, a plurality of radial metal feeding conduits in the lower portion of the receptacle and a center channel connecting said reservoir and said conduits.

6. In an apparatus according to claim 1, a heating source surrounding the receptacle.

7. In an apparatus according to claim 1, a center core and chamber forming radial partitions replaceably attached to said core.

8. In an apparatus according to claim 1, a bottom plate attached to the core and extending to the outer receptacle, the downwardly inclined connecting conduits being positioned above said bottom plate but ending short of the receptacle.

9. In an apparatus according to claim 1, the cylindrical receptacle being provided with a cover and a bottom and consisting of an inner graphite tube, an outer refractory tube, a carbon packing therebetween and an induction coil surrounding the receptacle.

10. In an apparatus according to claim 1, a cover for the receptacle and tubes for supplying gases to the reservoir and for the removal of the same from the chambers carried by said cover.

JOHN L. ELLIS.
CLAUS G. GOETZEL.

REFERENCES CITED

The following references are of record in the file of this patent:

UNITED STATES PATENTS

| Number | Name | Date |
| --- | --- | --- |
| 1,703,739 | Klepsch | Feb. 26, 1929 |
| 1,769,394 | Saxton | July 1, 1930 |
| 1,803,513 | Stockfleth | May 5, 1931 |
| 2,085,450 | Rohn | June 29, 1937 |
| 2,174,904 | Taylor | Oct. 3, 1939 |
| 2,210,544 | Galloway | Aug. 6, 1940 |
| 2,257,475 | Metz | Sept. 30, 1941 |
| 2,379,401 | Poulter | June 26, 1945 |
| 2,422,439 | Schwarzkopf | June 17, 1947 |
| 2,456,779 | Goetzel | Dec. 21, 1948 |